United States Patent
Marks

(10) Patent No.: US 10,308,345 B2
(45) Date of Patent: Jun. 4, 2019

(54) STRUCTURE

(71) Applicant: Airbus Operations Limited, Bristol (GB)

(72) Inventor: Oliver Marks, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 928 days.

(21) Appl. No.: 14/793,581

(22) Filed: Jul. 7, 2015

(65) Prior Publication Data

US 2016/0009365 A1    Jan. 14, 2016

(30) Foreign Application Priority Data

Jul. 8, 2014   (GB) .................................. 1412161.0

(51) Int. Cl.
*B64C 3/18*   (2006.01)
*B64C 3/26*   (2006.01)
(Continued)

(52) U.S. Cl.
CPC ............... *B64C 3/18* (2013.01); *B64C 3/182* (2013.01); *B64C 3/187* (2013.01); *B64C 3/26* (2013.01);
(Continued)

(58) Field of Classification Search
CPC ... B64C 2001/0072; B64C 3/18; B64C 3/182; B64C 1/064; B64C 3/26; B64C 1/065; B64C 3/187; B64C 5/00
See application file for complete search history.

(56) References Cited

U.S. PATENT DOCUMENTS 4,064,534 A * 12/1977 Chen ..................... B07C 5/126
                                                       250/559.22
4,186,535 A *  2/1980 Morton .................... E04B 1/24
                                                          52/250
(Continued)

FOREIGN PATENT DOCUMENTS

EP    2481668 A1    8/2012
EP    2540615 A1    1/2013
(Continued)

OTHER PUBLICATIONS

European Search Report for EP Application No. 15175758.0 dated Nov. 12, 2015.

*Primary Examiner* — Medhat Badawi
(74) *Attorney, Agent, or Firm* — Jenkins, Wilson, Taylor & Hunt, P.A.

(57) ABSTRACT

The invention relates to a structure having a panel, a stringer and a rib. The stringer has a stringer flange that is joined to an inner surface of the panel and a stringer web that extends away from the stringer flange. The rib has a rib web and a rib foot. The rib foot has a rib foot flange that is joined to the stringer web, first and second rib foot base parts that are joined to the inner surface of the panel or to the stringer flange and a rib foot web that is joined to the rib web. The rib foot is formed as a single folded piece such that the rib foot flange is connected to the rib foot web by a first folded corner, the first rib foot base part is connected to the rib foot flange by a second folded corner and the second rib foot base part is connected to the rib foot web by a third folded corner.

18 Claims, 5 Drawing Sheets

(51) Int. Cl.
    *B64C 5/00*        (2006.01)
    *B64C 1/00*            (2006.01)
(52) U.S. Cl.
    CPC ........ *B64C 5/00* (2013.01); *B64C 2001/0072*
                    (2013.01); *Y02T 50/43* (2013.01)

(56) References Cited

U.S. PATENT DOCUMENTS

| | | | | |
|---|---|---|---|---|
| 4,310,132 A * | 1/1982 | Frosch | ................... | B64C 1/068 244/119 |
| 5,242,523 A * | 9/1993 | Willden | .................. | B29C 70/44 156/285 |
| 5,297,760 A * | 3/1994 | Hart-Smith | ............. | B64C 1/068 244/132 |
| 5,518,208 A * | 5/1996 | Roseburg | ................ | B64C 1/064 244/119 |
| 5,893,534 A * | 4/1999 | Watanabe | ............... | B64C 1/064 244/119 |
| 5,963,660 A * | 10/1999 | Koontz | .................. | G01N 21/88 156/64 |
| 6,012,883 A * | 1/2000 | Engwall | ................ | B23Q 3/086 409/132 |
| 6,013,341 A * | 1/2000 | Medvedev | ............... | E04B 1/36 428/114 |
| 6,045,651 A * | 4/2000 | Kline | ................... | B29C 70/342 156/285 |
| 6,112,792 A * | 9/2000 | Barr | ........................ | B29C 70/32 156/441 |
| 6,114,012 A * | 9/2000 | Amaoka | ................ | B29C 70/30 244/119 |
| 6,155,450 A * | 12/2000 | Vasiliev | ................ | B29C 53/587 220/589 |
| 6,187,411 B1 * | 2/2001 | Palmer | .................. | B29C 70/543 428/102 |
| 6,190,484 B1 * | 2/2001 | Appa | ........................ | B29C 70/32 156/189 |
| 6,205,239 B1 * | 3/2001 | Lin | .................. | G01N 21/95607 257/E21.525 |
| 6,364,250 B1 * | 4/2002 | Brinck | ...................... | B64C 1/12 244/119 |
| 6,374,750 B1 * | 4/2002 | Early | .................... | B61D 17/041 105/377.01 |
| 6,386,481 B1 * | 5/2002 | Kallinen | .................. | B64C 3/18 244/123.1 |
| 6,415,581 B1 * | 7/2002 | Shipman | .................. | E04B 5/40 428/593 |
| 6,451,152 B1 * | 9/2002 | Holmes | ................ | B23K 26/034 156/173 |
| 6,480,271 B1 * | 11/2002 | Cloud | ..................... | G01C 15/02 356/140 |
| 6,508,909 B1 * | 1/2003 | Cerezo Pancorbo | ... | B29C 70/44 156/306.6 |
| 6,510,961 B1 * | 1/2003 | Head | ........................ | D04C 1/06 220/590 |
| 6,511,570 B2 * | 1/2003 | Matsui | ................... | B29C 70/345 156/245 |
| 6,692,681 B1 * | 2/2004 | Lunde | ................... | B29C 43/12 156/173 |
| 6,702,911 B2 * | 3/2004 | Toi | ........................ | B29C 70/443 156/93 |
| 6,730,184 B2 * | 5/2004 | Kondo | ................... | B29C 70/345 156/182 |
| 6,766,984 B1 * | 7/2004 | Ochoa | .................. | B64C 1/12 244/119 |
| 6,786,452 B2 * | 9/2004 | Yamashita | ............... | B64C 3/00 244/117 R |
| 6,802,931 B2 * | 10/2004 | Fujihira | ................ | B29C 70/342 156/292 |
| 7,721,495 B2 * | 5/2010 | Kismarton | ............... | B29C 65/564 248/188.2 |
| 7,740,932 B2 * | 6/2010 | Kismarton | ......... | B29D 99/0021 244/133 |
| 7,810,756 B2 * | 10/2010 | Alby | ........................ | B64C 1/26 244/119 |
| 8,038,099 B2 * | 10/2011 | Anast | ..................... | B64C 1/068 244/119 |
| 8,042,315 B2 * | 10/2011 | Ashton | ................... | E04C 2/326 244/119 |
| 8,042,767 B2 * | 10/2011 | Velicki | .................. | B29C 70/443 244/117 R |
| 8,056,859 B2 * | 11/2011 | Kunichi | ................... | B21J 15/14 244/123.1 |
| 8,096,504 B2 * | 1/2012 | Arevalo Rodriguez | ..................... | B29D 99/0014 244/119 |
| 8,157,212 B2 * | 4/2012 | Bjornstad | ............. | B29C 53/587 244/119 |
| 8,168,023 B2 * | 5/2012 | Chapman | ............... | B29C 70/323 156/166 |
| 8,173,055 B2 * | 5/2012 | Sarh | ........................ | B29C 70/32 264/219 |
| 8,336,596 B2 * | 12/2012 | Nelson | .................. | B29C 70/207 156/486 |
| 8,377,247 B2 * | 2/2013 | Guzman | .................. | B29C 43/10 156/212 |
| 8,382,467 B2 * | 2/2013 | Micheaux | ............... | B29C 33/38 249/176 |
| 8,388,795 B2 * | 3/2013 | Tsotsis | ................... | B29C 70/025 156/276 |
| 8,408,493 B2 * | 4/2013 | Barnard | ................. | B64C 1/064 244/119 |
| 8,419,402 B2 * | 4/2013 | Guzman | ................. | B29C 44/583 425/110 |
| 8,444,087 B2 * | 5/2013 | Kismarton | ............ | B29C 65/562 244/119 |
| 8,500,066 B2 * | 8/2013 | Lewis | .................... | B64D 45/00 244/119 |
| 8,534,605 B2 * | 9/2013 | Haack | .................... | B64C 1/068 244/117 R |
| 8,567,722 B2 * | 10/2013 | Rosman | ................... | B64C 1/068 244/131 |
| 8,617,687 B2 * | 12/2013 | McCarville | ............. | B29C 70/30 428/117 |
| 8,646,161 B2 * | 2/2014 | Bense | ........................ | B64F 5/10 269/97 |
| 8,651,421 B2 * | 2/2014 | Haack | .................... | B64C 1/061 244/119 |
| 8,695,922 B2 * | 4/2014 | Schroeer | ................... | B64C 1/061 244/117 R |
| 8,720,825 B2 * | 5/2014 | Kismarton | ............ | B29C 65/562 244/129.1 |
| 8,726,614 B2 * | 5/2014 | Donnellan | ............. | E02D 29/124 52/653.1 |
| 8,876,053 B2 * | 11/2014 | Moreau | ................... | B64C 1/064 244/131 |
| 8,934,702 B2 * | 1/2015 | Engelbart | ................ | B29C 70/38 356/237.1 |
| 8,943,666 B2 * | 2/2015 | Vera Villares | .......... | B64C 1/069 29/469 |
| 8,960,606 B2 * | 2/2015 | Diep | ........................ | B64C 1/12 244/131 |
| 8,998,142 B2 * | 4/2015 | Loupias | .................. | B64C 1/061 244/131 |
| 9,010,688 B2 * | 4/2015 | Shome | ..................... | B64C 1/12 244/119 |
| 9,187,167 B2 * | 11/2015 | Sauermann | ............ | B29B 13/025 |
| 9,340,273 B2 * | 5/2016 | Koefinger | ............... | B64C 1/066 |
| 9,527,572 B2 * | 12/2016 | Griess | ..................... | B64C 1/064 |
| 9,656,319 B2 * | 5/2017 | Sarh | ........................ | B21J 15/142 |
| 9,919,791 B2 * | 3/2018 | Autry | .................... | B29C 70/342 |
| 2001/0042186 A1 * | 11/2001 | Iivonen | ............. | G06F 17/30958 711/207 |
| 2001/0051251 A1 * | 12/2001 | Noda | ........................ | B32B 3/18 428/119 |
| 2002/0141632 A1 * | 10/2002 | Engelbart | ............. | G06T 7/0004 382/141 |
| 2003/0080251 A1 * | 5/2003 | Anast | ..................... | B64C 1/068 244/119 |

(56) References Cited

U.S. PATENT DOCUMENTS

| | | | |
|---|---|---|---|
| 2004/0021038 A1* | 2/2004 | Solanille | B22D 21/007 244/129.5 |
| 2004/0031567 A1* | 2/2004 | Engelbart | G01N 21/88 156/379 |
| 2004/0155148 A1* | 8/2004 | Folkesson | B32B 5/18 244/119 |
| 2005/0241358 A1* | 11/2005 | Kaye | B64C 3/18 72/379.2 |
| 2006/0226287 A1* | 10/2006 | Grantham | B64C 1/12 244/119 |
| 2010/0272954 A1* | 10/2010 | Roming | B64C 1/064 428/138 |
| 2010/0308172 A1* | 12/2010 | Depeige | B64C 1/062 244/132 |
| 2011/0001010 A1* | 1/2011 | Tacke | B64C 1/061 244/131 |
| 2011/0089291 A1* | 4/2011 | Dietrich | B64C 1/061 244/120 |
| 2012/0193475 A1* | 8/2012 | Cabanac | B64C 1/26 244/131 |
| 2013/0048187 A1* | 2/2013 | Wiles | B29C 70/086 156/60 |
| 2013/0089712 A1* | 4/2013 | Kwon | B64C 1/064 428/174 |
| 2013/0181092 A1* | 7/2013 | Cacciaguerra | B64C 1/068 244/131 |
| 2014/0216638 A1* | 8/2014 | Vetter | B29D 99/0014 156/227 |
| 2014/0263836 A1* | 9/2014 | Guillemaut | B64C 1/26 244/131 |
| 2015/0053818 A1* | 2/2015 | Charles | B64C 3/182 244/124 |
| 2016/0009061 A1* | 1/2016 | Marks | B29C 70/30 156/212 |
| 2016/0009365 A1* | 1/2016 | Marks | B64C 5/00 244/123.1 |
| 2016/0009366 A1* | 1/2016 | Marks | B64C 1/06 244/123.1 |
| 2016/0009367 A1* | 1/2016 | Marks | B64C 3/26 244/45 R |

FOREIGN PATENT DOCUMENTS

| | | |
|---|---|---|
| EP | 2565021 A1 | 3/2013 |
| EP | 2848519 A1 | 3/2015 |
| FR | 2923800 A1 | 5/2009 |
| WO | 2008067460 A2 | 6/2008 |
| WO | 2012098331 A2 | 7/2012 |
| WO | 2015015152 A1 | 2/2015 |

* cited by examiner

STRUCTURE

RELATED APPLICATIONS

The present application claims priority from Great Britain Application Number 1412161.0, filed Jul. 8, 2014, the disclosure of which is hereby incorporated by reference herein in its entirety.

FIELD OF THE INVENTION

The present invention relates to a structure. More particularly, although not exclusively, the present invention relates to an aircraft structure, for example a wing, horizontal stabiliser or vertical stabiliser.

BACKGROUND OF THE INVENTION

Traditional aircraft wings have a wing box formed by upper and lower aerodynamic covers, front and rear spars, and a series of transverse ribs spaced apart along the span-wise length of the wing box. Each rib is bolted to the upper and lower covers and reacts fuel pressure loads between them.

Assembly of such a wing box can be very time consuming and complicated due to the need to manufacture, drill, shim, and then bolt many components together. A traditional wing box is also very heavy and does not always make the most efficient use of modern aerospace materials such as composites.

It is desirable to design an aircraft wing box or similar structure which has a reduced part count, simplified manufacturing process and improved mechanical performance.

SUMMARY OF THE INVENTION

A first aspect of the invention provides a structure having a panel, a stringer and a rib, wherein the stringer includes a stringer flange joined to the panel and a stringer web extending away from the stringer flange; and the rib includes a rib web and a rib foot, the rib foot having a rib foot flange joined to the stringer web, first and second rib foot base parts joined to the panel or to the stringer flange, and a rib foot web joined to the rib web; wherein the rib foot flange is connected to the rib foot web by a first corner including at least one layer which runs continuously from the rib foot flange into the rib foot web via the first corner, the first rib foot base part is connected to the rib foot flange by a second corner including at least one layer which runs continuously from the first rib foot base part into the rib foot flange via the second corner, and the second rib foot base part is connected to the rib foot web by a third corner including at least one layer which runs continuously from the second rib foot base part into the rib foot web via the third corner.

The continuous construction of the rib foot enables it to be formed as a single part. This enables the number of components in the structure to be reduced and provides potential for the overall weight of the complete structure to be reduced.

The connection between the rib foot flange and the stringer web provides a robust load path. Typically the rib foot flange is joined to the stringer web by a joint which can transmit load in shear from the stringer web to the rib foot flange.

The construction of the rib foot also enables multiple flange angles to be accommodated or compensated for, which reduces the time and cost associated with controlling joints for tolerance and fit requirements.

Typically the rib foot flange, the first and second rib foot base parts and the rib foot web are formed integrally. By way of example the rib foot flange, the rib foot web and the rib foot base parts may be formed as a single piece which is then bent or folded to form the first, second and third corners. Alternatively the rib foot flange, the rib foot web and the rib foot base parts may be formed integrally by laying them up on a mould tool with an automated tape laying machine, with the first, second and third corners being formed as the tape is laid onto the mould tool. Alternatively the rib foot flange, the rib foot web and the rib foot base parts may be formed integrally by injection moulding or casting.

Regardless of the method of formation of the rib foot, the layers which run round the corners provide efficient load transfer between the adjacent parts of the rib foot which are connected by the corner.

Preferably the rib foot comprises at least one layer which runs round the first, second and third corners.

The structure may only have a single panel. Alternatively, the structure may further comprise a second panel opposite to the first panel. The rib web is arranged to transmit load (such as fuel pressure load) between the first panel and the second panel. Typically the rib web is joined to the second panel, either directly or via additional rib feet.

The structure may have only one stringer, but more typically it has a plurality of stringers joined to the panel with each stringer joined to the rib web by a respective rib foot.

The structure may have only one rib, or it may have more than one rib with each rib joined to the stringer by a respective rib foot.

The panel is typically elongate with a width and a length.

The stringer is typically elongate with a width and a length. The function of the stringer is to stiffen the panel by resisting bending loads along the length of the stringer.

The lengths of the panel and the stringer are typically approximately parallel.

The rib typically extends across the width of the panel.

The stringer may have a variety of cross-sectional shapes, including a T-shape, a Z-shape or a top-hat shape.

The stringer web may be a blade which extends away from the stringer to an elongate edge.

The rib may form a liquid-tight seal with the panel. Alternatively, the rib may allow liquid to flow across it, for example a gap may be provided between the rib web and the panel, the gap being arranged to permit liquid to flow through the gap.

Typically the rib web has an edge with a recess or cut-out through which the stringer web passes. In the case of a sealed rib then the stringer web may form a liquid tight seal with the rib web. Alternatively a gap is provided between the rib web and the stringer web, the gap being arranged to permit liquid to flow through the gap.

The first and/or second rib foot base parts may be joined to both the panel and the stringer flange. Alternatively, the first and/or second rib foot base part may be joined only to the stringer flange (optionally via a protruding grow-out region of the stringer flange).

The second and third folded corners may form an angle of approximately 90 degrees.

The first and/or second rib foot base part may be triangular in shape.

The first and second rib foot base parts may abut each other, or may be joined to one another by co-curing, by adhesive or by any other suitable means. Alternatively, the first and second rib foot base parts may be separate with a gap between them.

The rib foot may have a second rib foot flange joined to the stringer web, the first rib foot flange and the second rib foot flange extending on opposite sides of the rib foot web (forming a T section).

Additionally or alternatively, the rib foot may have third and fourth rib foot base parts joined to the inner surface of the panel and/or to the stringer flange, wherein the first and second rib foot base parts are positioned on a first side of the rib foot web and the third and fourth rib foot base parts are positioned on a second side of the rib foot web opposite the first side.

Optionally the rib foot comprises a pair of back-to-back parts, each part having a rib foot flange joined to the stringer web, first and second rib foot base parts joined to the panel or to the stringer flange, and a rib foot web joined to the rib web; wherein the rib foot flange is connected to the rib foot web by a first corner including at least one layer which runs continuously from the rib foot flange into the rib foot web via the first corner, the first rib foot base part is connected to the rib foot flange by a second corner including at least one layer which runs continuously from the first rib foot base part into the rib foot flange via the second corner, and the second rib foot base part is connected to the rib foot web by a third corner including at least one layer which runs continuously from the second rib foot base part into the rib foot web via the third corner. The rib foot webs of the pair of back-to-back parts are joined to each other and joined to the rib web. Alternatively, instead of having a pair of back-to-back rib foot parts which are joined to each other and both positioned on the same side of the rib web, the pair of rib feet may be arranged on opposite sides of the rib web (with the rib web sandwiched between them)—with each rib foot web contacting, and joined to, a respective face of the rib web.

The rib foot may be formed from a non-composite material (such as a metal) or a composite material including reinforcement elements embedded in a matrix. The reinforcement elements may, for example, comprise carbon fibre and/or glass fibre and/or Kevlar and/or metallic reinforcement in a polymer matrix. The panel and/or stringer and/or the rib web may also comprise a composite material of the same or different construction to the rib foot.

The rib foot may comprise a single layer of non-laminar material (such as a single piece of cast metal) which runs continuously round the first, second and third corners. Alternatively the rib foot may comprise a laminar material with a plurality of layers. In the case of a laminar material then each folded corner typically comprises a plurality of layers which run continuously round the corner.

The rib foot may be formed by arranging a stack of dry reinforcement plies together and subsequently adding matrix material to the stack before curing to form a consolidated component or alternatively by arranging a stack of pre-preg plies comprising reinforcement material before curing to form a consolidated component. Additionally or alternatively, the composite material may comprise randomly distributed reinforcement. For example, the rib foot may be formed as an injection moulded component with chopped strands or nano-tubes or particles of reinforcement material distributed through at least a portion of the composite material.

Preferably the rib foot is formed from a composite material comprising a plurality of fibres, wherein some of the fibres run continuously from the rib foot flange into the rib foot web via the first corner, some of the fibres run continuously from the first rib foot base part into the rib foot flange via the second corner, and some of the fibres run continuously from the second rib foot base part into the rib foot web via the third corner.

The rib foot may be joined to the rib web and/or to the panel and/or to the stringer flange and/or to the stringer web by a bonded joint—for instance: a co-cured joint, a co-bonded joint or a secondary bonded joint. This removes or reduces the need for drilling and/or bolting through the rib foot, the stringer and/or the panel, which increases the strain resistance of the structure and reduces the component weight. The reduced number of external fasteners also provides protection against lightning strike and improved fuel tank sealing if the structure is part of a fuel tank.

Additionally or alternatively, the rib foot may be joined to the panel and/or to the rib web and/or to the stringer flange and/or to the stringer web by one or more mechanical fasteners.

The structure may be adapted to carry fuel. In this case, the panel typically forms part of a sealed wall of a fuel tank which is arranged such that, when the fuel tank contains fuel, fuel pressure load acts on the panel.

The rib web may form a sealed fuel tank wall (that is a boundary wall adapted to retain fuel on one side of the wall with substantially no movement of fuel through the wall to an opposite side of the wall) or alternatively it may be an internal baffle (that is an internal element within a fuel tank adapted to allow fuel to pass from one side to the other via one or more orifices or holes).

The structure is typically part of an aerodynamic aircraft structure such as a wing box, a horizontal stabiliser or a vertical stabiliser. In this case the panel is typically a skin or cover panel with an outer aerodynamic surface over which air flows during flight of the aircraft, and an inner surface to which the stringer flange is joined. The stringer stiffens the panel and carries aerodynamic loads during flight of the aircraft.

A second aspect of the invention provides a method of forming a structure, the method including the steps: (a) providing a panel, a stringer having a stringer flange and a stringer web, and a rib having a rib web; (b) forming a rib foot having a rib foot flange, a rib foot web and first and second rib foot base parts so that the rib foot flange is connected to the rib foot web by a first corner including at least one layer which runs continuously from the rib foot flange into the rib foot web via the first corner, the first rib foot base part is connected to the rib foot flange by a second corner including at least one layer which runs continuously from the first rib foot base part into the rib foot flange via the second corner, and the second rib foot base part is connected to the rib foot web by a third corner including at least one layer which runs continuously from the second rib foot base part into the rib foot web via the third corner; (c) joining the stringer flange to the panel; (d) joining the rib foot flange to the stringer web; (e) joining the first and second rib foot base parts to the inner surface of the panel or to the stringer flange; and (f) joining the rib foot web to the rib web.

In step (c) the stringer flange may be joined to the panel by co-curing or co-bonding and/or in step (d) the rib foot flange may be joined to the stringer web by co-curing or co-bonding and/or in step (e) the first and second rib foot base parts may be joined to the panel or to the stringer flange by co-curing or co-bonding and/or in step (f) the rib foot web may be joined to the rib web by co-curing or co-bonding. Additionally or alternatively, the rib foot web may be joined to the rib web by one or more mechanical fasteners.

Preferably step (b) comprises forming the rib foot flange, the rib foot web and the first and second rib foot base parts as a single piece, then bending or folding the single piece to form the first, second and third corners.

The method of forming the structure may be automated, thereby enabling rapid manufacture of the structure and increased production rates.

BRIEF DESCRIPTION OF THE DRAWINGS

An embodiment of the invention will now be described with reference to the accompanying drawings, in which.

DETAILED DESCRIPTION OF EMBODIMENT(S)

Figure 1:
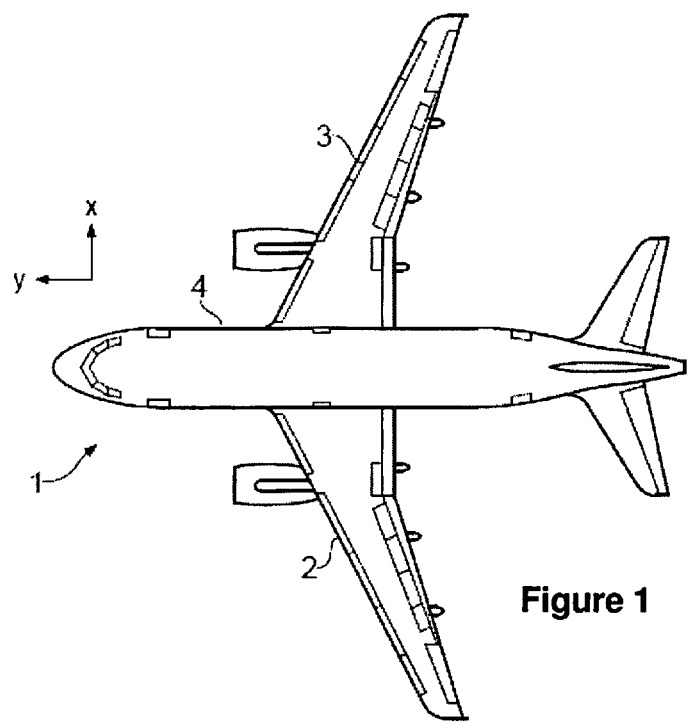
FIG. 1 is a plan view of an aircraft.

FIG. 1 shows an aircraft 1 with port and starboard wings 2, 3. Each wing has a cantilevered structure with a length extending in a spanwise direction from a root to a tip, the root being joined to an aircraft fuselage 4. The wings 2, 3 are similar in construction so only the starboard wing 3 will be described in detail with reference to FIGS. 2a and 2b.

Figure 2A:
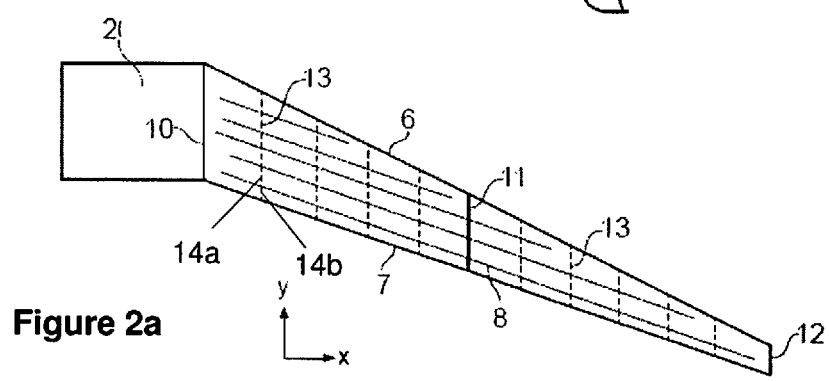
FIG. 2a is a schematic plan view of a starboard wing box and centre wing box.
Figure 2B:
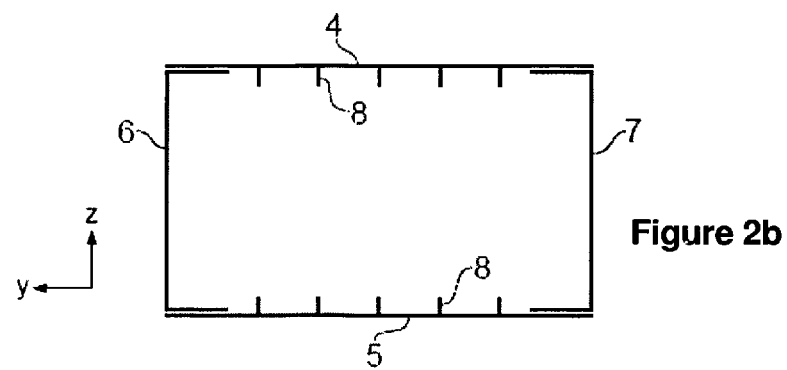
FIG. 2b is a schematic chord-wise sectional view of the starboard wing box.

The main structural element of the wing is a wing box formed by upper and lower covers 4, 5 and front and rear spars 6, 7, as shown in FIGS. 2a and 2b. The covers 4, 5 and spars 6, 7 are each Carbon Fibre Reinforced Polymer (CFRP) laminate components. Each cover is a panel with an aerodynamic surface (the upper surface of the upper cover 4 and the lower surface of the lower cover 5) over which air flows during flight of the aircraft. Each cover also has an inner surface carrying a series of stringers 8 extending in the spanwise direction. Each cover carries a large number of elongate stringers 8, only five of which are shown in FIGS. 2a and 2b for the purposes of clarity. Each stringer 8 is joined to one cover but not the other, and runs in a span-wise direction approximately parallel to a length of the cover to which it is attached.

The wing box also has a plurality of ribs which run in a chord-wise direction, approximately transverse to the stringers and across the width of the covers, each rib being joined to the covers 4, 5 and the spars 6, 7. The ribs include an innermost inboard rib 10 located at the root of the wing box, and a number of further ribs spaced apart from the innermost rib along the length of the wing box. The wing box is divided into two fuel tanks: an inboard fuel tank bounded by the inboard rib 10 and mid span rib 11, the covers 4, 5 and the spars 6, 7; and an outboard fuel tank bounded by the mid span rib 11 an outboard rib 12 at the tip of the wing box, the covers 4, 5 and the spars 6, 7.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2a, the stringers 8 stop short of the inboard rib 10 and the outboard rib 12, but pass through the baffle ribs 13 and the mid span rib 11.

Figure 3A:
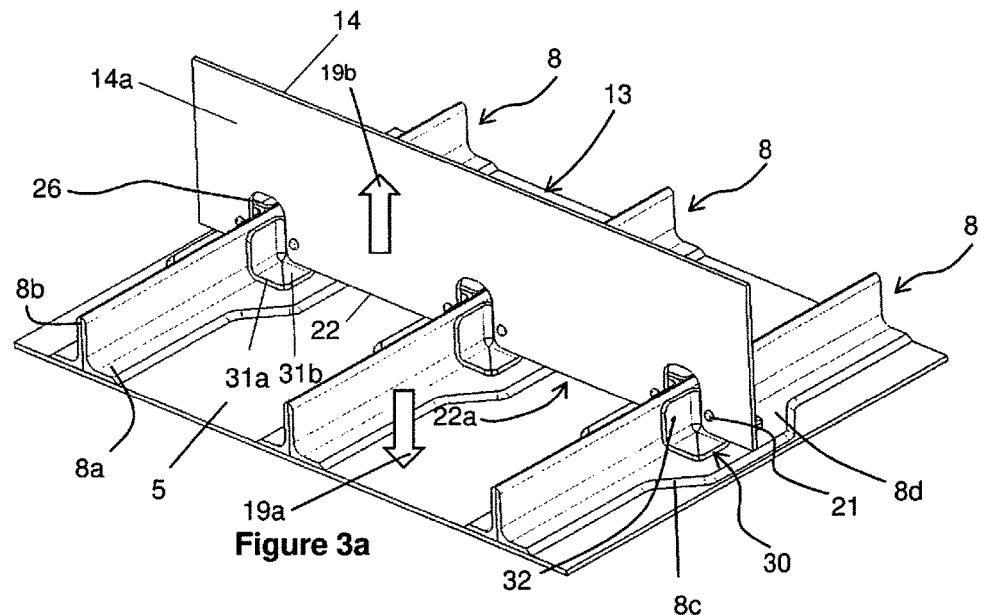
FIG. 3a is an isometric view of a structure according to the invention from the inboard side.
Figure 3B:
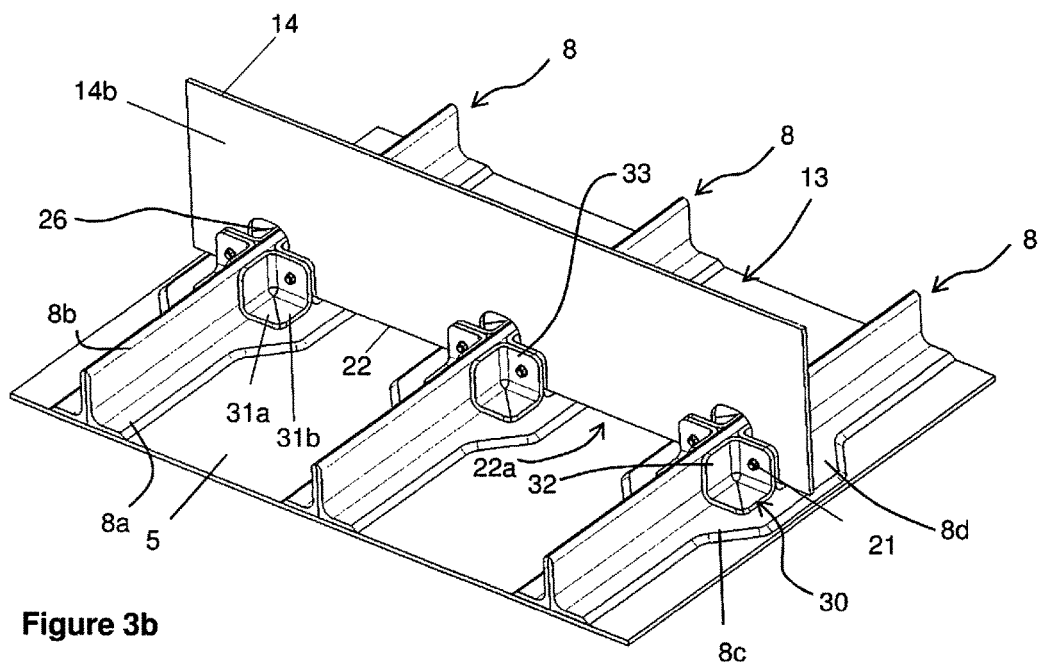
FIG. 3b is an isometric view of the structure of FIG. 3a from the outboard side.
Figure 4:
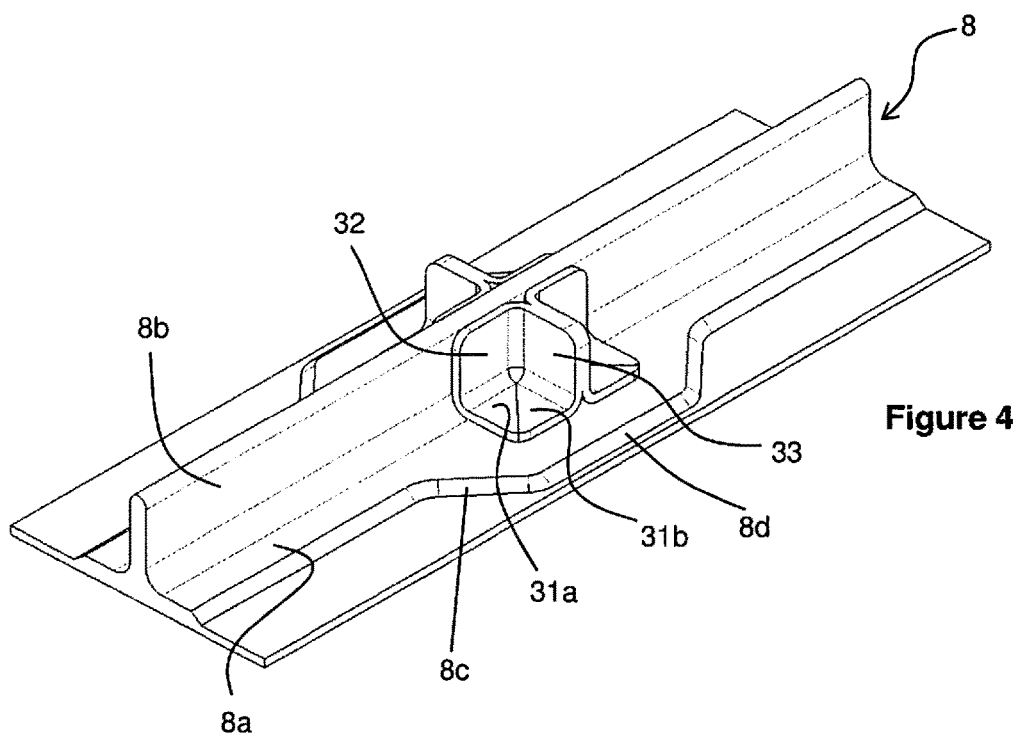
FIG. 4 is an isometric view of the structure of FIGS. 3a and 3b with the rib removed.
Figure 5:
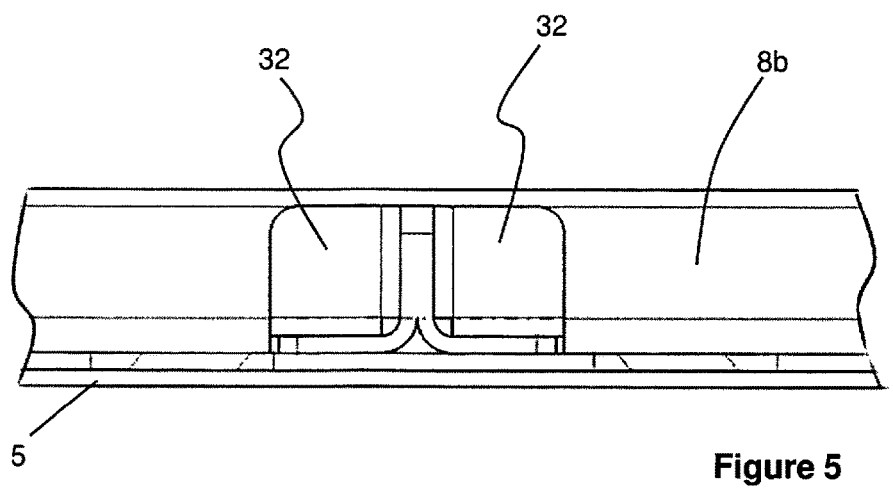
FIG. 5 is a left view of the structure of FIGS. 3a and 3b.
Figure 6:
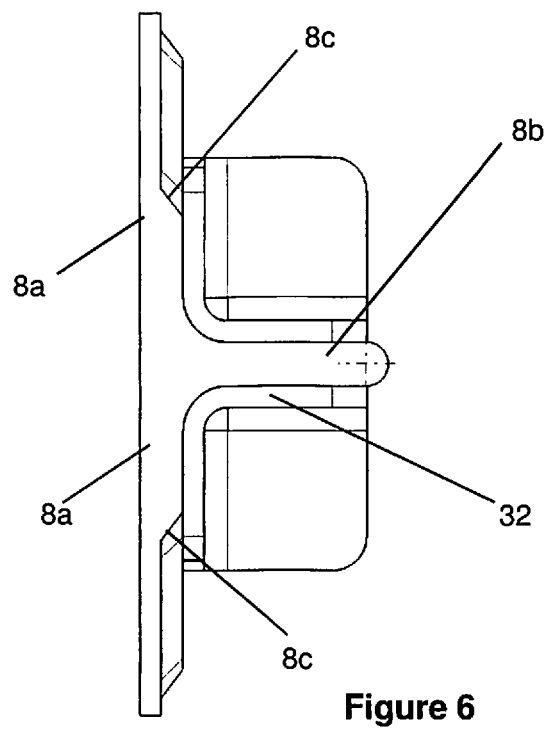
FIG. 6 is front view of the structure of FIGS. 3a, 3b and 5.

FIGS. 3a to 6 show a structure forming part of the interface between one of the baffle ribs 13 and the lower cover 5, including three of the stringers 8. The stringers 8 are CFRP laminate components. Each stringer 8 has a T-shaped cross-section with a pair of flanges 8a co-cured to the cover 5, and a web or blade 8b extending upwardly from the flanges 8a away from the cover 5 to a free upper edge. Each flange 8a has a tapering lateral edge 8c and a protruding grow-out region 8d (FIG. 4). The stringers 8 have a "roll-formed" structure in which the flanges 8a and web 8b are formed from a single folded sheet.

The baffle rib 13 comprises a planar metallic web 14 connected to the lower cover by a plurality of CFRP laminate rib feet 30.

Figure 7:
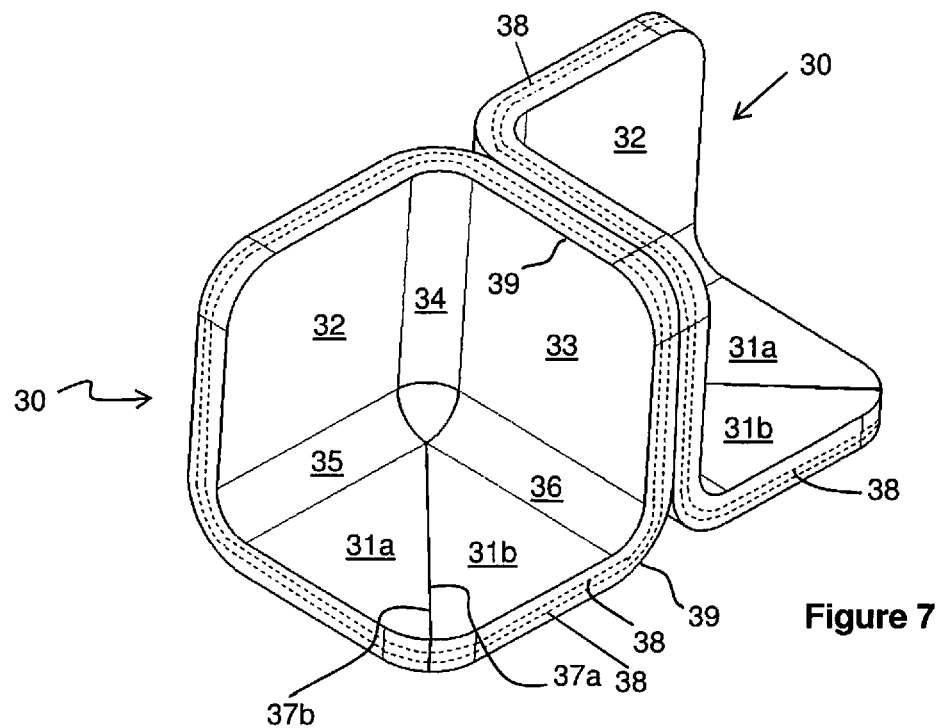
FIG. 7 is an isometric view of a pair of rib feet.

As shown in FIG. 7, each rib foot 30 has a generally horizontal first rib foot base part 31a, a generally horizontal second rib foot base part 31b, an upstanding rib foot flange 32; and an upstanding rib foot web 33. As shown in FIG. 7, the rib foot flange 32 is connected to the rib foot web 33 by a first folded corner 34, the first rib foot base part 31a is connected to the rib foot flange 32 by a second folded corner 35 and the second rib foot base part 31b is connected to the rib foot web 33 by a third folded corner 36. Edge 37a of the first rib foot base part 31a abuts edge 37b of the second rib foot base part 31b to form a mitre joint.

The rib foot flange 32 is co-cured to the stringer flange web 8b, and the rib foot base parts 31a, 31b are co-cured to the protruding grow-out region 8d of the stringer flange 8a. The co-cured joint (without bolts) with the rib foot base parts 31a, 31b mean that no drilled bolt holes need to be provided in the cover 5 or the stringer flange 8a. This enables the thickness (and hence weight) of the cover 5 to be reduced compared with a bolted arrangement. The lack of external bolts in the cover 5 also provides protection against lightning strike and improved fuel tank sealing.

Each rib foot web 33 is joined to the rib web 14 by a bolt 21 (shown in FIGS. 3a and 3b).

The rib web 14 has planar inboard and outboard faces 14a, 14b on opposite sides of the web which meet at a lower edge 22 shown in FIGS. 3a and 3b, and an upper edge (not shown in FIGS. 3a and 3b). The inboard face 14a of the rib web is visible in FIG. 3a and the outboard face 14b of the rib web is visible in FIG. 3b. The lower edge 22 is separated from the inner surface of the cover 5 by a gap 22a. Fuel can flow across the rib web 14 through this gap 22a. The lower edge of the rib web 14 is also formed with recesses or cut-outs through which the stringer webs 8b pass. Fuel can also flow through the arched upper part 26 of each cut-out. Holes (not shown) may also be provided in the rib web 14 to minimise its weight and provide further routes for fuel to flow.

Only the lower part of the rib web 14 is shown in FIGS. 3a and 3b. The upper edge of the rib web may be connected to the upper cover 4 by rib feet 30 in a similar fashion, or it may be connected to the upper cover 4 by more conventional rib feet.

The rib web 14 has fore and aft edges (visible in FIG. 2a) which are secured to the spars 6, 7.

Figure 8:
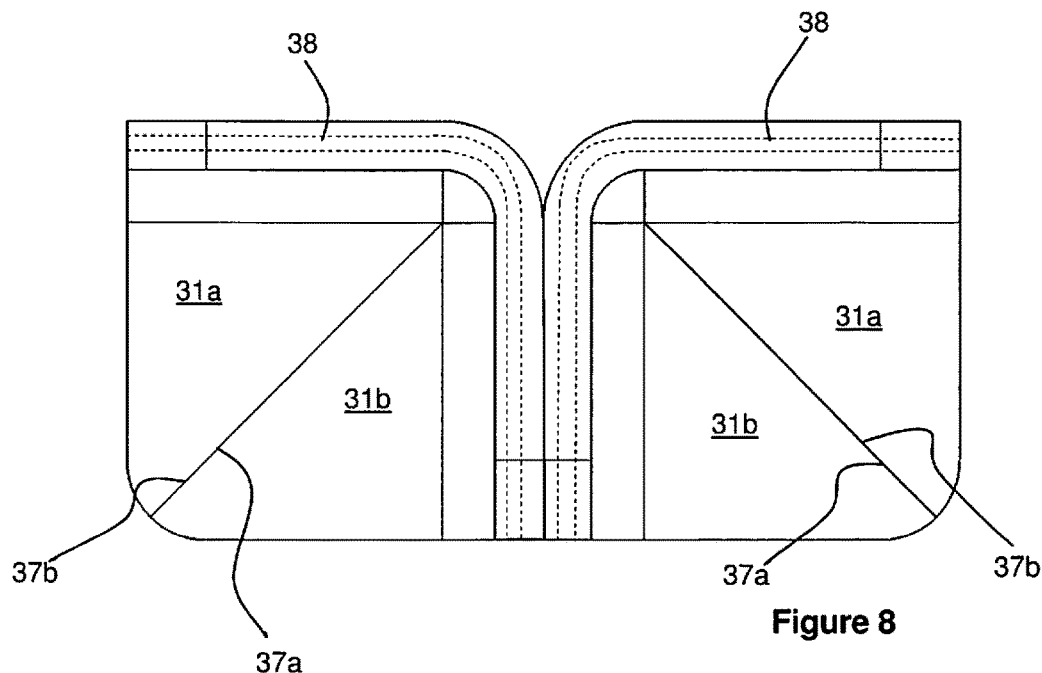
FIG. 8 is a top view of the pair of rib feet of FIG. 8.

As shown in FIG. 4, the rib feet 30 are arranged in pairs on a stringer such that two rib feet 30 are positioned back-to-back with the rib foot web 33 of one rib foot 30 co-cured to the rib foot web 33 of the other rib foot 30. A pair of back-to-back rib feet 30 is shown in more detail in FIGS. 7 and 8.

As shown in FIGS. 3a and 3b, the back-to-back pair of rib foot webs 33 is joined to the outboard face 14b of the rib web adjacent to the lower edge 22. The inboard one of the pair of rib feet contacts the outboard face of the web. The rib foot base part 31b and the rib foot flange 32 of that inboard rib foot cross over the plane of the rib and then extend in an inboard direction away from the inboard face 14a of the rib web as can be seen in FIG. 3a. The rib foot base part 31b passes through the gap 22a and the rib foot flange 32 passes through the through the recess or cut-out (along with the stringer web 8b to which it is attached).

In an alternative embodiment (not shown) the back-to-back pair of rib foot webs 33 is joined to the inboard face 14a of the rib web (rather than the outboard face 14b) adjacent to the lower edge 22. In this case the outboard one of the pair of rib feet contacts the inboard face of the web.

In both of these embodiments the rib foot web 33 and the rib web 14 have opposed mating faces which are joined at a web joint interface which lies in a plane (i.e. the plane of the inboard face 14a or the plane of the outboard face 14b depending on which face contacts the rib foot). The flange and base parts of one of the pair of rib feet is positioned on one side of this plane, and the flange and base parts of the other one of the pair of rib feet is positioned on the other side of the plane. This provides a more balanced arrangement than if only a single rib foot was used rather than a back-to-back pair.

Each stringer 8 is joined to the rib web by two pairs of rib feet 30—one back-to-back pair on each side of the stringer web 8b which are mirror images of each other, as shown in FIG. 4.

Figure 9:
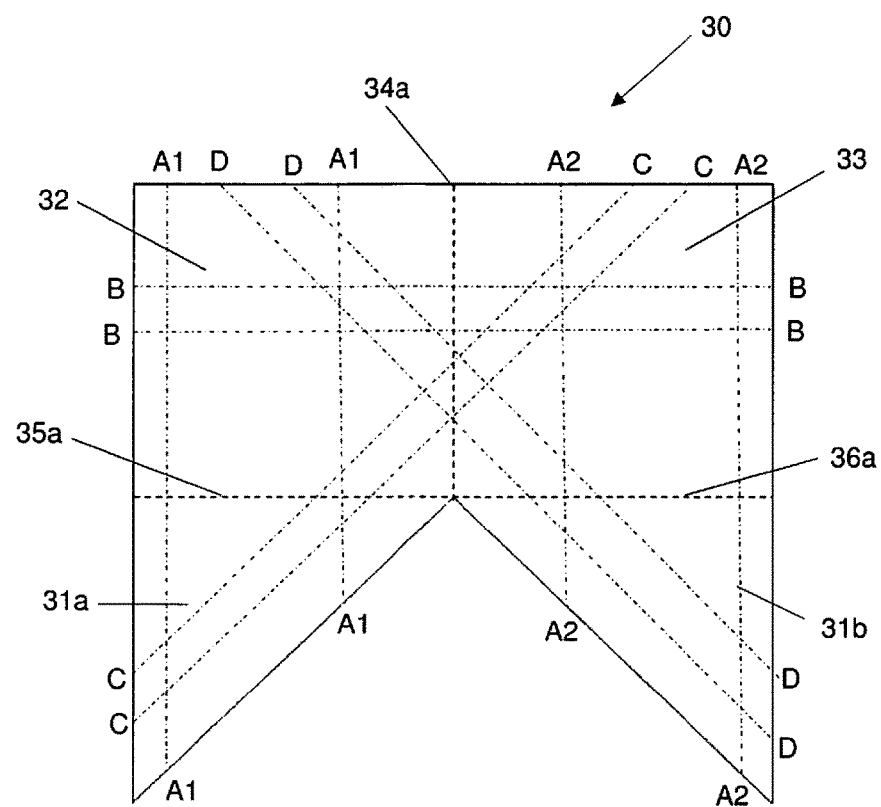
FIG. 9 is a plan view of a blank for forming a rib foot.

Each rib foot 30 is formed from a blank comprising a flat stack of pre-preg composite plies in the shape shown in FIG. 9. Each ply in the stack consists of unidirectional carbon fibres impregnated with an epoxy resin matrix.

The rib foot base part 31a is bent or folded away from the rib foot flange 32 along a fold line 35a to form the corner 35, and the rib foot base part 31b is bent or folded away from the rib foot web 33 along a fold line 36a to form the corner 36. The rib foot flange 32 is bent or folded away from the rib foot web 33 at a fold line 34a to form the corner 34.

The carbon fibres in each ply are oriented at either 0 degrees, +/−45 degrees or 90 degrees. FIG. 9 shows by way of example four 0 degree fibres A1, A2, two 90 degree fibres B, two +45 degree fibres C, and two −45 degree fibres D. Some of the 0 degree fibres (including the fibres A1) run continuously from the first rib foot base part 31a into the rib foot flange 32 via the fold line 35a. Some of the 0 degree fibres (including the fibres A2) run continuously from the second rib foot base part 31b into the rib foot web 33 via the fold line 36a. Some of the 90 degree fibres (including the fibres B) run continuously from the rib foot flange 32 into the rib foot web 33 via fold line 34a. Some of the +45 degree fibres (including the fibres C) run continuously from the first rib foot base part 31a into the rib foot flange 32 via the fold line 35a and into the rib foot web 33 via the fold line 34a. Some of the −45 degree fibres (including the fibres D) run continuously from the second rib foot base part 31b and into the rib foot web 33 via the fold line 36a and into the rib foot flange 32 via the fold line 34a. In this way, loads are transferred by the carbon fibres around each of the folded corners 34-36.

The stack of pre-preg plies includes a pair of external plies 39 (one being labeled in FIG. 7) and a plurality of internal plies sandwiched between the external plies, two of which are indicated by dashed lines and labeled 38 in FIG. 7. The external plies 39 and the internal plies 38 (along with most if not all of the other internal plies in the stack) run continuously throughout the rib foot from the first rib foot base part 31a into the rib foot flange 32 via the folded corner 35, from the rib foot flange 32 into the rib foot web 33 via the folded corner 34, and from the rib foot web 33 into the second rib foot base part 31b via the folded corner 36.

One of the loads acting on the structure is fuel pressure load which acts down on the lower cover 5 as indicated by arrow 19a in FIG. 3a, and is reacted as tension 19b in the rib web 14. The primary path for this load is through the rib foot base part 31b, the corner 36, the rib foot web 33 and the bolt 21. A secondary path for this load is through the stringer web 8b, the rib foot flange 32, the corner 34, the rib foot web 33 and the bolt 21.

In the example above, the rib feet 30 are formed by pre-preg composite parts. Alternatively, the rib feet 30 may be manufactured by injection moulding of epoxy resin (or other liquid matrix material) containing short fibre reinforcement elements.

In the embodiment described above the rib feet 30 and stringers 8 are formed as separate components which are joined together by co-curing opposed mating faces. Alternatively, some of the internal plies forming the rib feet 30 may be laid up so that they are interleaved with some of the internal plies forming the stringers 8.

The cover assembly of FIG. 4 is formed by placing the various components on a mould in an un-cured or partly cured state. A vacuum bag is laid over the components on the mould, the space between the vacuum bag and the mould is evacuated to apply pressure, and the assembly is heated to cure the components. As the components cure, the various co-cured joints mentioned above are formed. The mould may be made from a rigid material, or more preferably from a semi-rigid material. A suitable semi-rigid material is a synthetic rubber such as Airpad (an uncured non-silicone rubber available from Airtech Europe Sarl), reinforced with open weave dry carbon such as Cristex 170-100, with additional local reinforcement and therefore stiffness added with Toolmaster (R) Pre-preg TMGGP4000 and TMGP4100.

Although the invention has been described above with reference to one or more preferred embodiments, it would be appreciated that various changes or modifications may be made without departing from the scope of the invention as defined in the appended claims.

The invention claimed is:

1. A structure comprising:
a panel;
a stringer comprising a stringer flange joined to the panel and a stringer web extending away from the stringer flange;
a rib comprising a rib web and a rib foot, the rib foot having a rib foot flange joined to the stringer web;
first and second rib foot base parts joined to the panel or to the stringer flange; and
a rib foot web joined to the rib web;
wherein the rib foot flange is connected to the rib foot web by a first corner that includes at least one layer which runs continuously from the rib foot flange into the rib foot web via the first corner;

wherein the first rib foot base part is connected to the rib foot flange by a second corner that includes at least one layer which runs continuously from the first rib foot base part into the rib foot flange via the second corner; and wherein the second rib foot base part is connected to the rib foot web by a third corner that includes at least one layer which runs continuously from the second rib foot base part into the rib foot web via the third corner.

2. The structure according to claim 1, wherein the first rib foot base part abuts the second rib foot base part or is joined to the second rib foot base part.

3. The structure according to claim 1, wherein the rib foot comprises at least one layer which runs around the first, second, and third corners.

4. The structure according to claim 1, wherein the first rib foot base part is joined to the second rib foot base part by a co-cured joint.

5. The structure according to claim 1, wherein the rib foot flange is joined to the stringer web by a co-bonded or co-cured joint.

6. The structure according to claim 1, wherein the first and second rib foot base parts are joined to the panel or to the stringer flange by a co-bonded or co-cured joint.

7. The structure according to claim 1, wherein:
the rib foot is formed from a composite material comprising a plurality of fibres,
some of the fibres run continuously from the rib foot flange into the rib foot web via the first corner,
some of the fibres run continuously from the first rib foot base part into the rib foot flange via the second corner, and
some of the fibres run continuously from the second rib foot base part into the rib foot web via the third corner.

8. The structure according to claim 1, wherein the rib foot comprises a further rib foot flange joined to the stringer web, the further rib foot flange and the rib foot flange extending on opposite sides of the rib foot web.

9. The structure according to claim 8, wherein the second rib foot flange is joined to the stringer web by a co-bonded or co-cured joint.

10. The structure according to claim 1, wherein the rib foot comprises a further rib foot base part joined to the panel or to the stringer flange, the further rib foot base part and the first and second rib foot base parts extending on opposite sides of the rib foot web.

11. The structure according to claim 1, wherein the rib foot comprises a pair of back-to-back parts, each of which comprises:
a rib foot flange joined to the stringer web;
first and second rib foot base parts joined to the panel or to the stringer flange; and
a rib foot web joined to the rib web, wherein the rib foot flange is connected to the rib foot web by a first corner including at least one layer, which is continuous from the rib foot flange into the rib foot web via the first corner, wherein the first rib foot base part is connected to the rib foot flange by a second corner including at least one layer, which is continuous from the first rib foot base part into the rib foot flange via the second corner, wherein the second rib foot base part is connected to the rib foot web by a third corner including at least one layer which is continuous from the second rib foot base part into the rib foot web via the third corner, and wherein the rib foot webs of the pair of back-to-back parts are joined to each other and to the rib web.

12. The structure according to claim 1, wherein the structure is an aerodynamic aircraft structure.

13. The structure according to claim 12, wherein the aerodynamic aircraft structure is an aircraft wing box.

14. An aircraft comprising a fuselage and the structure according to claim 12, wherein the structure is attached to and extends away from the fuselage.

15. A method of forming a structure, the method including steps of:
providing a panel, a stringer comprising a stringer flange and a stringer web, and a rib comprising a rib web;
forming a rib foot comprising a rib foot flange, a rib foot web, and first and second rib foot base parts;
connecting the rib foot flange to the rib foot web by a first corner including at least one layer, which is continuous from the rib foot flange into the rib foot web via the first corner;
connecting the first rib foot base part to the rib foot flange by a second corner including at least one layer, which is continuous from the first rib foot base part into the rib foot flange via the second corner; and
connecting the second rib foot base part to the rib foot web by a third corner including at least one layer, which is continuous from the second rib foot base part into the rib foot web via the third corner;
joining the stringer flange to the panel;
joining the rib foot flange to the stringer web;
joining the first and second rib foot base parts to the inner surface of the panel or to the stringer flange; and
joining the rib foot web to the rib web.

16. The method according to claim 15, wherein the rib foot flange, the rib foot web, the first rib foot base part, and the second rib foot base part are formed as a single piece, which is subsequently bent or folded to form the first, second, and third corners.

17. The structure according to claim 12, wherein the aerodynamic aircraft structure is an aircraft horizontal stabilizer.

18. The structure according to claim 12, wherein the aerodynamic aircraft structure is an aircraft vertical stabilizer.

* * * * *